United States Patent [19]

van der Heyden

[11] Patent Number: 5,077,139

[45] Date of Patent: Dec. 31, 1991

[54] COATING APPLIED TO PISTON RODS OF HYDRAULIC CYLINDERS

[75] Inventor: Marius van der Heyden, Boxtel, Fed. Rep. of Germany

[73] Assignee: Hydraudyne Cylinders b.v., Boxtel, Netherlands

[21] Appl. No.: 503,835

[22] Filed: Apr. 3, 1990

[30] Foreign Application Priority Data

Apr. 3, 1989 [DE] Fed. Rep. of Germany ....... 3910725

[51] Int. Cl.⁵ ............................................. B23B 15/04
[52] U.S. Cl. .................................... 428/632; 428/633; 428/666; 428/680; 501/127; 501/134
[58] Field of Search ............... 428/627, 632, 633, 666, 428/680; 501/127, 134

[56] References Cited

U.S. PATENT DOCUMENTS

| | | | |
|---|---|---|---|
| 4,335,190 | 6/1982 | Bill et al. | 428/633 X |
| 4,529,631 | 7/1985 | Neudahm | 427/398.3 |
| 4,761,346 | 8/1988 | Naik | 428/632 X |
| 4,839,239 | 6/1989 | Ducos | 428/632 X |
| 4,876,158 | 10/1989 | Onuki et al. | 428/614 X |
| 4,913,980 | 4/1990 | Rowcliffe et al. | 428/632 |
| 4,996,117 | 2/1991 | Chu et al. | 428/633 |

FOREIGN PATENT DOCUMENTS

| | | |
|---|---|---|
| 384035 | 9/1987 | Austria . |
| 2850210 | 5/1979 | Fed. Rep. of Germany . |
| 3337012 | 9/1983 | Fed. Rep. of Germany . |
| 446851 | 3/1968 | Switzerland . |

*Primary Examiner*—Karl Group
*Attorney, Agent, or Firm*—Harness, Dickey & Pierce

[57] ABSTRACT

This invention refers to piston rods of hydraulic cylinders made of steel to which a metallic layer of nickel and chrome and a ceramic layer is applied. The combination of the inventive coating is selected such that a non-porous, highly anti-corrosive coating of predetermined hardness and sliding characteristics is obtained which highly increases the lifetime in hostile environment and decreasing wear.

7 Claims, No Drawings

COATING APPLIED TO PISTON RODS OF HYDRAULIC CYLINDERS

The present invention relates to a coating applied to piston rods of hydraulic cylinders made of steel.

BACKGROUND OF THE INVENTION

Piston rods of hydraulic cylinders as well as other movable parts of hydraulic installations, fittings, valves and shafts to operate locks and bridges offshore and aboard of vessels are subjected to a very hostile environment causing corrosion resulting in a substantially reduced lifetime. A protection against corrosion for all these components made of regular steel, i.e. carbon steel is thus a must when they should maintain their ability to be actuated.

As a rule, piston rods and similar parts are coated with a metallic layer of chrome and/or nickel chrome. However, such layers are susceptible against chemical agents resulting in localized corrosion like pitting, wherein the chrome layer is corroded from outside so that the part becomes defective after some time.

The artisan is of course further aware to make mechanical parts of stainless steel which are coated with a chrome layer to be wear resistant. Parts made this way are extremely expensive.

According to some further prior art (German patent 33 37012) a pump plunger is provided with a ceramic coating. However, the plunger is made of a nickel-chrome alloy which is extremely expensive.

According to some further art (German 28 50 210) spikes made of stainless steel and carrying a ceramic layer are welded to steam boiler tubes for protection. According to a further proposal an aluminum oxide layer including TiO2 is applied to material such as tubing in combustion chambers which material is subjected to high heat stress.

SUMMARY OF THE INVENTION

It is an object of the present invention to provide a corrosion resistant coating for piston rods of hydraulic cylinders and the like.

The improvement achieved by the present invention is obtained by applying a metallic bonding layer to said piston rods made of regular carbon steel and applying a ceramic layer to said metallic bonding layer.

According to the present invention it was realized to make the piston rod of regular carbon steel to keep costs low and to apply the layers according to the invention to obtain a highly corrosive resistant and wear resistant part which is capable to maintain its motivity for an extended time. The present invention is seen in the application of a combined binding and ceramic layer known per se to piston rods of hydraulic cylinders and the like.

The ceramic layer provides an extremely high resistance against chemical environment as well as a very high wear resistancy under mechanical environments such as abrasive particles, sand, dust and the like. In addition the components selected for the ceramic layer are selected such that the wear of the bearing structure, for example the cylinder bearing for the piston rod does not become unduly high. According to the invention the ceramic layer combines corrosion resistance and hardness to substantially increase the lifetime, while the layer can be still machined without encountering problems.

The composition of the ceramic layer may be optimized by selecting proper ratios of $Al_2O_3$ and $TiO_2$, wherein the portion of $TiO_2$ is at least 10%. The thickness of the ceramic layer is in the order of approximately 100 $\mu$m up to 300 $\mu$m to substantially fill the ceramic layer and to avoid porosity which is inherent to the material. To obtain a complete freeness of pores the ceramic layer is applied to a metallic non-porous bonding layer. The metallic bonding layer consists of nickel and chrome in a thickness of 10 to 70 $\mu$m. The ceramic layer exhibits sliding characteristics which are comparable to that of chrome and nickel-chrome layers known so that the wear is very low, while on the other side the corrosion resistancy, the homogeneity of the layers, the sliding characteristics and the wear resistancy is highly increased over the known metallic layers. Piston rods having a diameter of 25 mm up to 1400 mm with longitudinal extensions of up to 12 m can be treated as specified.

I claim:

1. A carbon steel hydraulic cylinder piston rod having a coating comprising: a non-porous metallic bonding layer comprised of nickel and chrome adhered to said carbon steel piston rod and a ceramic layer comprised of $Al_2O_3$ adhered to said metallic bonding layer.

2. The coating of claim 1, wherein the ceramic layer substantially consists of $Al_2O_3$ including a portion of $TiO_2$.

3. The coating of claim 2, wherein the portion of $TiO_2$ is at least 10%.

4. The layer of claim 1, wherein the thickness of the ceramic layer is between 100 to 300 $\mu$m.

5. The coating of claim 1, wherein the ceramic layer substantially consists of $Al_2O_3$ including a portion of at least 10% of $TiO_2$, and wherein the thickness of the ceramic layer is between 100 to 300 $\mu$m.

6. The coating of claim 1, wherein the metallic bonding layer consists of nickel and chrome.

7. The coating of claim 6, wherein the thickness of the metallic layer is between 10 to 70 $\mu$m.

* * * * *

UNITED STATES PATENT AND TRADEMARK OFFICE
CERTIFICATE OF CORRECTION

PATENT NO. : 5,077,139
DATED : December 31, 1991
INVENTOR(S) : Marius van der Heyden It is certified that error appears in the above-identified patent and that said Letters Patent is hereby corrected as shown below:

Column 2, line 39, Claim 1, after "$Al_2O_3$" insert --and $TiO_2$--.

Signed and Sealed this

Fifteenth Day of June, 1993

Attest:

MICHAEL K. KIRK

Attesting Officer     Acting Commissioner of Patents and Trademarks